(12) United States Patent
Michael

(10) Patent No.: US 8,225,201 B2
(45) Date of Patent: Jul. 17, 2012

(54) DEVICE AND METHOD FOR GENERATING A TEXT OBJECT

(75) Inventor: Oliver Michael, Theilheim (DE)

(73) Assignee: Garmin Würzburg GmbH (DE)

( * ) Notice: Subject to any disclaimer, the term of this patent is extended or adjusted under 35 U.S.C. 154(b) by 1125 days.

(21) Appl. No.: 12/105,802

(22) Filed: Apr. 18, 2008

(65) Prior Publication Data

US 2008/0276167 A1    Nov. 6, 2008

(30) Foreign Application Priority Data

May 3, 2007  (DE) .......................... 10 2007 021 128
Feb. 21, 2008  (DE) .......................... 10 2008 010 419

(51) Int. Cl.
*G06F 17/00* (2006.01)

(52) U.S. Cl. ......... 715/254; 715/255; 715/256; 715/269

(58) Field of Classification Search ........... 715/200–277
See application file for complete search history.

(56) References Cited

U.S. PATENT DOCUMENTS

| | | | | |
|---|---|---|---|---|
| 5,539,868 | A * | 7/1996 | Hosoya et al. ................ | 345/471 |
| 7,430,473 | B2 * | 9/2008 | Foo et al. ...................... | 701/212 |
| 7,549,114 | B2 * | 6/2009 | Bederson et al. ............. | 715/200 |
| 7,711,478 | B2 * | 5/2010 | Gluck ........................... | 701/208 |
| 7,925,429 | B2 * | 4/2011 | Geelen .......................... | 701/201 |
| 8,026,923 | B1 * | 9/2011 | Gupta ........................... | 345/581 |
| 2008/0266298 | A1 | 10/2008 | Hess et al. | |

FOREIGN PATENT DOCUMENTS

EP    1 921 422 A1    5/2008
JP    10 301929 A    11/1998

OTHER PUBLICATIONS

Green, et al., "Suggested Human Factors Design Guidelines for Driver Information Systems", Technical Report UMTRI-93-21, revised Aug. 1994, p. 1-119.*
European Search Report dated Jan. 29, 2010, 1 page.

* cited by examiner

*Primary Examiner* — Amelia Rutledge
(74) *Attorney, Agent, or Firm* — Samuel M. Korte; Mohammad M. Ali

(57) ABSTRACT

A graphic output device for generating a mixed graphic-textual depiction having at least one text object consisting of multiple letters for identifying a geographic feature, the output device comprising a processor unit, which is set up to reshape the text object in such a manner that the reshaped text object comprises, in addition to a normal text area having letters in the original size, a compressed text area having letters shrunken and/or compressed in relation to the original size, the boundary between the normal text area and the compressed text area running along a semantic jump point of the text object. A method for preparing a text object consisting of multiple letters using a processor unit, for the purpose of depicting the text object using a graphic output device.

10 Claims, 2 Drawing Sheets

Beckmannstraße

Beckmannstraße

Beckmannstraße

Fig. 3

Beckmannstraße

Berliner Chaussee

Fig. 4

Berliner Chaussee

Frankfurt an der Oder

Fig. 5

Frankfurt an der Oder

Autohaus Bergland GmbH

Fig. 6

Autohaus Bergland GmbH

DEVICE AND METHOD FOR GENERATING A TEXT OBJECT

CROSS-REFERENCE TO RELATED APPLICATION

This application claims the priority benefit of German Patent Application No. 10 2007 021 128.9 filed on May 3, 2007, and this application also claims the priority benefit of German Patent Application No. 10 2008 010 419.1 filed on Feb. 21, 2008, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention relates to an output device for generating a graphic-textual depiction having at least one object consisting of multiple letters, in particular for identifying a geographic feature.

BACKGROUND OF THE INVENTION

Devices and/or methods for the output or display of, for example, geographic or cartographic depictions—the depictions comprising text objects—are frequently used in navigation systems, for example. In the case of application in navigation systems, it is generally necessary to prepare geographic information and depictions, such as map depictions, in such a manner that they may be displayed on a display unit belonging to the navigation system, in particular on a navigation display screen.

Additionally or alternatively to the display of geographic depictions and/or map depictions, it is also typically necessary in navigation systems to display text objects on the display screen.

Text depictions of this type are generally used for the textual identification of specific geographic features depicted on the display unit of the navigation system, for the identification of map features such as cities, streets, points of interest, landscape features, etc., or also for the selection of textually depicted list elements from a selection menu and/or from a list, for example, for the purpose of destination input.

Conventional navigation systems usually have comparatively small display units or display screens, however, on which multiple items of graphic information and also additional text information frequently must be depicted. Thus, for better orientation of the user of a navigation system, for example, roads, cities, and other geographic or landscape features are generally provided with a textual identification which—alternatively or additionally to the graphic depiction of the corresponding features themselves—must be housed on the available area of the display screen.

The problem frequently arises in the prior art that the space and/or text depiction area available on the display screen of the navigation unit is often inadequate to place the items of text information provided or necessary for informing the user to the desired extent and also in a readable size on the display screen.

This means that as a frequent compromise in the prior art only a part of the actually required or desirable text information may actually be placed on the display screen. Alternatively, in navigation units known from the prior art, items of text information are either shown only abbreviated, which worsens the readability and intuitive comprehensibility of the information, or a very small text size is selected, which may also result in inadequate recognizability. This may possibly even become a safety problem in street traffic, for example, specifically if the user of a navigation system must apply too large a part of his concentration to reading off texts which are illegible or difficult to recognize, such as road identifications, from the display screen of the navigation system.

A device and a method for generating a text object, which are based on a similar set of problems, are known from unpublished German Patent Application DE 10 2006 052 663.5 and corresponding U.S. patent application Ser. No. 11/923,794 filed Oct. 25, 2007, which are hereby incorporated by reference as if fully set forth herein in their entirety. In these patent applications, to solve the problems described, it is suggested that a part of the text object to be depicted be depicted in shrunken and/or compressed form, so that a larger part of the text object or the entire text object to be depicted may be fitted into the space available on the display device.

However, this method does not take into consideration the possibly differing size of the meaning content of the various components of a text object in the modification and depiction of the text object. Therefore, it may occur in this method that parts of the text object which make up an essential meaning content of the text object are depicted strongly compressed or shrunken, while other parts of the text object which possibly only contribute little to the meaning content of the text object are shown in the original size.

SUMMARY OF THE INVENTION

The present invention provides a device and/or a method for preparing a text object, using which the cited disadvantages to be found in the prior art may be overcome. In particular, longer text objects can also be able to be displayed on small output devices, such as navigation display screens, without space required for other purposes on the display screen thus being claimed. Simultaneously, however, important components of the text object which are required for the rapid and intuitive understanding of the text object by the user can be be prevented from being depicted shrunken or compressed more than necessary. A possibility is thus to be found for identifying components of text objects which contain information of only little relevance to the user automatically and in a rule-based manner and being able to depict them correspondingly shrunken. In street names, terms such as "street", "boulevard", or "freeway intersection" would be examples of such name components which only contain little relevant information for the user and may therefore be shown in shrunken form.

The present invention also provides a graphic output device for generating a mixed graphic-textual depiction having at least one text object consisting of multiple letters for the identification of a geographic feature. The output device can include a processor unit, which is set up to reshape the text object in such a manner that the reshaped text object comprises, in addition to a normal text area having letters in the original size, a compressed text area having letters shrunken and/or compressed in relation to the original size. The boundary between the normal text area and the compressed text area can run along a semantic jump point of the text object. The output device can be set up for depicting letters using more than two different size dimensions within a text object. The size dimensions of letters within defined surroundings of the jump point can be changed steadily and/or continuously between the size dimension of the letters of the normal text area and the size dimension of the letters of the compressed text area. The output device can further include a storage unit having a collection of semantic, morphological and/or linguistic rules of grammar. The output device can contain lists of text components having fixed, in particular lower semantic relevance. A relevance notation can be stored for every normal text area and for every text area of the text object to be compressed. A relevance notation can be stored only for text areas of the text object to be compressed. The size dimensions of the letters of the compressed text area can be only changed in one dimension. The device can be set up to automatically ascertain the maximal original size of the letters of the normal text area as a function of the space available for the text object. The output device can be a transportable navigation device, a terminal for an online navigation service, desktop or mobile fleet software, or a desktop publishing unit.

Another aspect of the present invention is a method for preparing a text object consisting of multiple letters using a processor unit, for the purpose of depicting the text object using a graphic output device, the text object comprising a normal text area having letters in the original size and a text area to be compressed having letters shrunken and/or compressed in relation to the original size. The method can include the steps of a) analysis of the text object to be depicted on the basis of stored semantic, morphological, and/or linguistic rules and/or stored auxiliary information; b) morphological division of the text object to be depicted into text areas and/or morphemes; c) ascertainment of the semantic relevance of the text areas and/or morphemes; d) storage of the relevance analysis results for each text area having reduced semantic relevance; e) rendering of the letters of text areas having normal semantic relevance in the original size and the letters of text areas having reduced semantic relevance using shrunken size dimensions on the basis of the relevance analysis results; and f) output of the rendered text object on the graphic output device. The auxiliary information in method step a) can include current country, language, object type, location type and/or location size, street type and street significance and/or text position of the object type in the object name. The auxiliary information in method step a) can include lists of text components having reduced semantic relevance, such as prefixes, infixes, suffixes, initial syllables and terminal syllables, language-specific articles and prepositions, abbreviations and business forms, lists of separators, and/or rules for composite formation and syllable separation. In method step e), letters within defined surroundings of the jump point between normal and compressed text areas can be rendered steadily and/or continuously between the size dimension of the letters of the normal text area and the size dimension of the letters of the compressed text area. If a separator is present at the jump point in method step e), a discontinuous, sudden change of the letter size can occur. Ascertaining and storing the relevance analysis results in method steps c) and d) can occur in the form of the assignment of a more than two-stage relevance value to the particular text area. The storage of the relevance analysis results in method step d) can be performed with data compression using run-length coding. Method steps a) through d) can be performed at the runtime directly preceding the letter rendering. Method steps a) through d) can be performed in the scope of preprocessing of a database comprising the text object. The original size can be a variable, the original size being fixed as a function of the space available for depicting the text object and/or as a function of the object significance of the text object.

The output device according to an embodiment of the invention can be used for generating a graphic-textual depiction, the depiction comprising at least one text object consisting of multiple letters, which is used for identifying a geographic feature, for example. The output device can comprises a processor unit for this purpose, the processor unit being set up to reshape the text object to be depicted in such a manner that the reshaped text object also comprises, in addition to a normal text area in which the letters have an original size, a compressed text area. In the compressed text area, the letters can be shrunken and/or compressed in relation to the original size.

According to another embodiment of the invention, the boundary between the normal text area and the compressed text area can run along a semantic jump point of the text object.

In this manner, it may be ensured that only those text areas of the text object to be depicted which have a semantically deviating, in particular a lesser semantic relevance, than the remaining text area of the text object can be depicted shrunken. In addition, however, it may be ensured that area boundaries between the normal and compressed text areas run along semantically relevant points in the text object and thus do not interrupt the text and reading flow or the concentration of the observer. The shrinking and/or compression of the letters of the compressed text area may alternatively or additionally comprise a shrinking or compression of the intervals of these letters.

According to an embodiment of the invention, the output device can be set up in such a manner that letters or letter intervals may be shown using more than two different size dimensions within a text object. This can allow not only two-stage differentiation, but rather also a finer graduation as a result of differing semantic relevance of various text areas of the text object. Accordingly, a multiply graduated compression of text areas having correspondingly graduated reduced semantic relevance may occur.

According to a further embodiment of the invention, the output device can be set up in such a manner that the size dimensions of the letters of a reshaped text object are changed steadily and/or continuously within surroundings of defined size around the jump point between the original size of the letters of the normal text area and the size dimension of the letters of the compressed text area. In this manner, still smoother transitions may be achieved between the normal text areas (having letters in the original size) and the compressed text areas (having letters of reduced size), through which the reading flow of the observer experiences still less interruption.

In a further embodiment of the invention, the output device can contain a memory unit having a collection of semantic, morphological, and/or linguistic rules of grammar.

On the basis of the rules of grammar contained in the memory unit in this embodiment, in particular suitable jump points in the text object may be automatically identified, at which the transition from the normal text area to the compressed text area is to occur. Storage space can be saved, because the suitable jump points and degrees of relevance of the text components do not also have to be stored separately for every possible text object, which is, for example, stored in a navigation system. In addition, the use of existing data sets and/or text databases may be continued unchanged; furthermore, in addition to street names, practically arbitrary other text data to be depicted, such as points of interest, etc., may also be processed and depicted accordingly partially compressed. In particular, automatic identification and extraction of typical syllables, which are typically of lesser significance within words, may be performed on the basis of the morphological analysis of the text object. In the event of a suitable scope of the stored rule set, text data from various languages may additionally be processed and shown correspondingly compressed.

According to a further embodiment of the invention, the output device can contain lists of text components having fixed, in particular low semantic relevance, in a memory unit.

By comparing the text components to be depicted with the stored lists, an automatic identification of jump points and/or text components of the text object to be depicted in compressed form may thus be performed. In particular, articles, prepositions, abbreviations, word components, and suffixes and/or prefixes may be contained in the stored lists, which typically have a reduced semantic relevance in comparison to other text components of text objects and thus may be depicted shrunken without significant information loss. The use of existing data sets and/or navigation databases may also be continued unchanged in this embodiment, and an application of the semantic text compression may be performed simply in different languages, if the stored lists of text components having lower semantic relevance extend to the corresponding languages.

According to a further embodiment of the invention, a relevance notation can be already stored for every normal text area to be depicted in the original size and for every text area to be compressed of the text object to be depicted. In this embodiment, a simple reshaping of the text object may be performed directly on the basis of the stored relevance notation. The stored relevance notation may have been ascertained, for example, by an analysis performed before the actual rendering of the text object. The analysis of the text object and storage of the corresponding relevance notation of its components may either be performed on the processor unit of the output device, or may have already been performed beforehand during the generation of the database on a separate data processing system of the user or the provider.

In this embodiment, especially high rapidity of the display rendering results, and reduced requirements can be placed on the output device in regard to the computing power at the runtime of the rendering of the letters of the text object. This embodiment can be thus particularly suitable for output devices having a comparatively low computing power of their own.

With this background, according to a further embodiment, a relevance notation can be only stored for text areas to be compressed, but not for those text areas which are to be depicted uncompressed and in the original size. In this manner, memory space can be saved, because no additional memory space for storing the relevance notation is required for normal text areas, having high semantic relevance, which are not to be compressed.

The invention may be implemented independently of how the reshaping of the areas of the text object to be compressed is performed graphically and/or geometrically, as long as the space requirement of the text object can be reduced by the compression.

According to another embodiment of the invention, however, the size dimensions of the letters of the text area to be compressed can be only changed in one dimension, preferably in the longitudinal direction of the text object, during the compression.

In this manner, the text object can be shortened just as effectively as in a proportional compression and/or shrinking of the letters along both letter dimensions, i.e., along both the height and also the width of the letters, without the letters becoming too small, however. This is because in this embodiment, with equally effective shortening, only linear but not squared shrinking of the area occupied by the shrunken letters occurs. Thanks to this embodiment, the number of pixels used per letter for depiction on the output device, i.e., in particular on a display screen, can be also only reduced linearly and not squared in relation to the reduced length of the text object. In this manner, in spite of the compression of the text object, a good resolution and thus readability of the letters can still be achieved. This is significant in particular in regard to LCD display screens, which usually have a resolution three times higher in the horizontal direction than in the vertical direction, as soon as anti-aliasing is taken into consideration and/or a suitable sub-pixel rendering is performed during the generation of the letters.

According to a further embodiment of the invention, the output device can be set up to automatically ascertain the maximum original size of the letters of the normal text area. The maximum original size is ascertained as a function of the maximum space available to display the text object. In this manner, a further optimization of the readability results, in that the partially compressed text object may be depicted as a whole having the maximum possible text size within the available space. In this manner, partially-compressed text objects may thus be prevented from still being too long for the available space even after the compression, and partially-compressed text objects may also be prevented from not reaching the total length available for depiction.

The invention may be applied in principle wherever an output of textual information is to be performed and where only limited space is available for this purpose. With this background, according to further embodiments of the invention, the output device is a transportable navigation device, a terminal for an online navigation service, fleet software for stationary or mobile use, or a desktop publishing unit. The invention may also be used in general for displaying texts on compact portable devices such as PDAs or mobile telephones. In all of these cases, the invention may advantageously be applied in particular when the largest possible textual information content is to be depicted on a limited area.

The invention also relates to a method for generating a text object comprising multiple letters for the purpose of depicting the text object using a graphic output device. A processor unit is used, and the text object comprises a normal text area having letters in the original size and a text area to be compressed having letters shrunken and/or compressed in relation to the original size.

The method according to an aspect of the invention has the following method steps:

Firstly, in a first method step a), an analysis of the text object to be depicted is performed on the basis of stored semantic, morphological, and/or linguistic rules and/or on the basis of auxiliary information stored in a database in addition to the text object. Subsequently, in a further method step b), a morphological division of the text object to be depicted into various text areas and/or morphemes is performed on the basis of the stored rules and/or auxiliary information. Then, in a further method step c), an ascertainment of the semantic relevance of the previously established text areas and/or morphemes is performed, according to which, in a further method step d), the result of the relevance analysis for each text area having reduced semantic relevance is stored.

Subsequently, in a further method step e), the rendering of the letters of the text object is performed on the basis of the relevance analysis results. The letters of text areas having normal and/or high semantic relevance are rendered in the original size, while the letters of text: areas having reduced semantic relevance are rendered having shrunken size dimensions. Finally, in a further method step f), the output of the rendered text object on the graphic output unit is performed.

This means that according to the invention only those text areas of the text object which are assigned a reduced semantic significance within the text object are rendered shrunken and correspondingly depicted shrunken. It is simultaneously ensured that area boundaries between normal and compressed text areas are not placed arbitrarily (which could make the readability more difficult), but rather are situated at semantically relevant points in the text object. In this manner, an optimal text flow and a good readability and comprehension of the information content of the text object result in spite of the partial compression of the text object.

According to another embodiment of the invention, the auxiliary information in method step a) can comprise current country, language, object type, location type and/or location size, street type and street meaning and/or text position of the object type, location type, and/or street type in the object identification.

In this manner, thanks to the stored auxiliary information, an accurate automatic identification and separation of text components having individualizing character from text components having categorizing character may be performed. Text components having individualizing character are, in the geometric field, for example, the base name of a street, a city, a point of interest, or another geographic object, while text components having categorizing character are formed by the type of the street or the geographic object, for example. If, in addition to the text objects to be depicted, auxiliary information about their individual components is also stored, it may be easily ascertained which areas of a text object to be depicted have a high semantic relevance and thus are to be depicted in the original size (for example, the base name of a street), and which areas of the text object only have a reduced semantic relevance, and may thus be output in compressed form (for example, the street type or a suffix such as street, way, boulevard, etc.).

The relationship between the object type and the text components of the object identification to be depicted is also significant and can accordingly be taken into consideration. This is because, as a function of which object type is provided, a differing relevance may result for the individual text components of the text object. Thus, for example, the suffix "-strasse" [street] in a street name may be classified as less relevant, because it only indicates the categorizing street type, but not the individualizing street name. In contrast, the same information "-strasse" may be classified as relevant in certain circumstances in a location name such as "Neustadt an der Weinstrasse", for example. This is also similarly true for points of interest, where, for example, the object identification "Karstadt" may have a high relevance as a whole as a name for a point of interest, while the suffix "-stadt" [city] in a city name may be classified as less relevant.

According to a further embodiment of the invention, the auxiliary information in method step a) can comprise lists of text components having reduced semantic relevance, such as prefixes, infixes, suffixes, initial syllables and terminal syllables, language-specific articles and prepositions, abbreviations and business forms, lists of separators, and/or rules for composite formation and syllable separation in particular. Thanks to this embodiment, text components having reduced semantic relevance may be identified automatically and reliably even with variable and/or unlimited scope of text objects to be depicted. In this manner, the method may also be applied without prior data preparation of any individual text object to practically arbitrary text data sets, as soon as the corresponding scope of auxiliary information has been provided once. In regard to the reshaping of business forms, which typically depict country-specific abbreviations, an advantage can be that they are provided in uppercase letters in many cases and thus would frequently occupy an especially large amount of space on the display in the event of unchanged depiction.

In a further embodiment of the invention, in method step e), letters which are located within defined surroundings of the jump point between normal text area and compressed text area can be rendered having steadily and/or continuously variable size dimensions between the size dimension of the letters of the normal text area and the size dimension of the letters of the compressed text area. In this manner, an optimized adaptation to the reading flow can result, in that a smoother transition is provided between normal text area and compressed text area.

According to a further embodiment of the invention, in the event of the presence of a separator at a jump point between a normal and a compressed text area of a text object, in method step e), a discontinuous, sudden change of the letter size and/or the degree of the compression of the letters can be fixed. This embodiment has the background that a desired break in the text depiction can be provided in any case in the area of separators of a text object. At such a point, a flowing transition in the letter size and/or in the degree of the compression of the letters thus may and should be dispensed with. Moreover, because of the sudden size change, in this manner additional space may be saved in relation to the continuous size change of the letters at a semantic jump point. Suitable separators for this purpose are, for example, the space, the hyphen, the point, or the apostrophe, the scope of spaces to be taken into consideration being able to vary as a function of the current country and/or the output language or as a function of specific stored data to be processed.

In a further embodiment of the invention, the ascertainment and storage of the relevance analysis results in method steps c) and d) can be performed in the form of an assignment of a greater than two-stage relevance value to the particular text area. In this manner, a not only two-stage, but rather multistage differentiation of the relevance of the text areas and thus a corresponding multistage variable degree of compression may be performed for the corresponding text areas having reduced relevance. This means in particular that text areas having especially low semantic relevance may also be depicted especially small, while simultaneously text areas having moderately-high semantic relevance may be compressed less strongly, for example.

The results of the relevance analysis in method step d) can be preferably stored with a data compression using a run-length coding, in that for a text object, only the beginning and the length of a text area having constant semantic relevance is stored in each case, instead of storing a separate relevance value for every letter of the text object. In this manner, a low-loss and nonetheless strongly compressed storage of the results of the relevance analysis may be performed with significant savings of storage space.

The notation of the results of the relevance analysis in relation to the individual letters of the text object to be depicted can allow, in the simplest case, the relevance value to be stored in binary form (relevant yes/no). Optionally, however, multistage intermediate values may also be ascertained and stored in regard to the relevance, the letter sizes to be depicted upon the later output of the text object correlating to the particular stored relevance value. A letter having a stored relevance value of "zero" may thus be assigned the predefined minimal letter size and a letter having the relevance value "one" may be assigned the predefined maximal letter size, while letters of text components having moderate relevance may be assigned a value between 0 and 1, through which a moderate letter size is selected upon the depiction of the text object.

In a further embodiment of the invention, method steps a) through d) can be performed at the runtime directly preceding the letter rendering. Storage space can also be saved in this embodiment, because the results of the relevance analysis each only have to be stored for the few text objects to be depicted at that instant—instead of for the entire multitude of text objects contained in a database. Thanks to this embodiment, it can also be possible, for example, to react immediately and dynamically to changes of all information on which the display is based. Because the reshaping of the text objects to be displayed always only occurs directly preceding the actual output, changes of the stored data, such as changes of street names, points of interest, or the like, and also any changes of the semantic auxiliary information may thus be taken into consideration and incorporated in the reshaping of the text objects at any time.

In an alternative embodiment of the invention, method steps a) through d) can be performed in the scope of preprocessing of a database comprising the text object.

In this embodiment, the method can also be applied in terminals having only comparatively little available computing power. This results from the fact that in this embodiment the relevance analysis does not have to occur directly before and/or at the runtime of the text depiction, but rather may already be performed beforehand using a specialized, higher-performance unit. In this case, the results of the relevance analysis are not only generated and stored beforehand for the text areas and/or text objects to be currently depicted, but rather preferably for all text objects of the database. More memory space is thus necessary, but on the other hand, the analysis of the text objects to be depicted and thus computing time can be saved at the runtime of the rendering of the display depiction.

In a further embodiment of the invention, the original size of the letters of the text object can be variable. The original size of the letters of the text object can be fixed as a function of the space available for depicting the text object and/or as a function of the basic significance of the text object. In this manner, further optimization of the text depiction and readability may be performed, in that partially compressed text objects are also depicted having the overall maximal length in consideration of the space available. If necessary, an overall proportional shrinking of those text objects which have a comparatively low basic significance may also be performed, so that more space remains on the display for text objects having higher basic significance.

In the following, embodiments of the invention are explained in greater detail on the basis of drawings which merely illustrate exemplary embodiments.

BRIEF DESCRIPTION OF THE DRAWINGS

FIG. 3 shows a schematic illustration of an example of a street name in the partially compressed form according to the invention and uncompressed in the original size for comparison;

FIG. 4 shows, in an illustration corresponding to FIG. 3, a further example of a street name in the partially compressed form and in the original size for comparison;

FIG. 5 shows, in an illustration corresponding to FIGS. 3 and 4, an example of a location name in the partially compressed form and in the original size for comparison; and FIG. 6 shows, in an illustration corresponding to FIGS. 3 through 5, an example of the identification of a point of interest in the partially compressed form and in the original size for comparison.

DETAILED DESCRIPTION OF THE EXAMPLE EMBODIMENTS

Figure 1:
FIG. 1 shows an example of the display screen depiction of a navigation device according to the prior art having a list of addresses and/or potential travel destinations.
Figure 2:
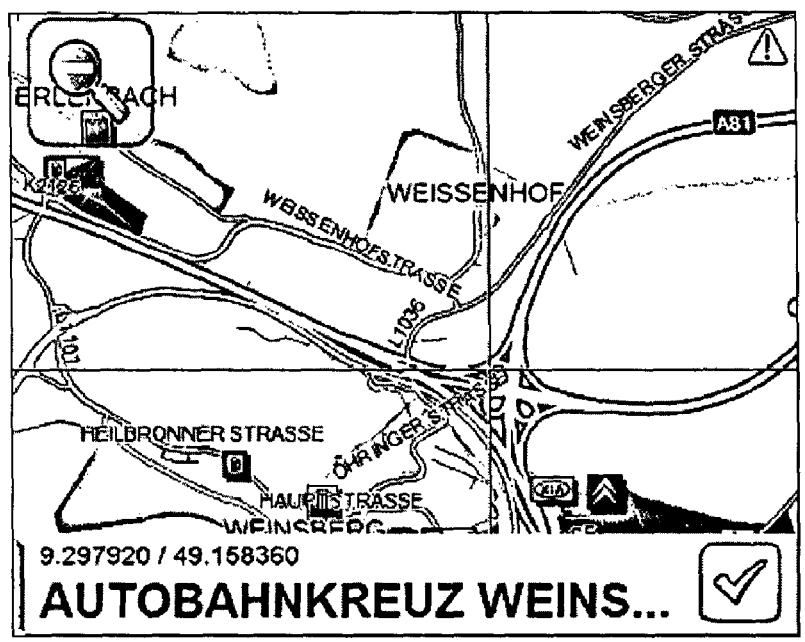
FIG. 2 shows a further example of a display screen depiction of a navigation device according to the prior art having a map depiction and having text overlay.

FIGS. 1 and 2 each show display screen illustrations of navigation devices according to the prior art. FIG. 1 shows a list of addresses and/or potential driving destinations on the display screen of a navigation device, while FIG. 2 shows a map illustration having text overlay of a route point which has just been reached situated underneath.

It may be seen that the particular depicted text identifications partially have to be strongly abbreviated for space reasons, to be able to be housed within the horizontal space available. Both the readability and also of the rapid comprehension of the actual information content of a text identification thus suffer. In certain circumstances, the meaning of a text identification shown abbreviated in this manner may no longer be ascertained at all or may only be ascertained by guessing. It is obvious that this is not only undesirable, but rather may become a safety problem in street traffic in particular in mobile navigation applications, which require attentiveness during travel.

The text identifications of various geographic features recognizable in the map illustration in FIG. 2 also partially have a significant length, which may result in difficulties and restrictions either in the readability or in housing the text identifications—such as the street names—in the area of the particular identified map object. Actually desirable text identifications thus either have to be left out entirely or depicted strongly shortened, so that they do not overlap with other objects to be depicted.

In contrast, some examples of partially compressed text objects according to embodiments of the invention are shown in FIGS. 3 through 6, each in relation to the same text object shown uncompressed in the original size for comparison. It is clearly recognizable that the partial compression and/or shortening of the text objects according to the invention saves space to a significant degree, without parts of the text object having to be left out or cut off, however.

Of the illustrated examples, FIGS. 3 and 4 each relate to a street name, FIG. 3 showing a one-part street name, while FIG. 4 is a two-part street name.

In regard to the example of FIG. 3 having the street name "Beckmannstrasse", the analysis and partial compression of the street name according to the invention is performed as follows.

Firstly, on the basis of auxiliary information stored for this text object—e.g., in a database or in the associated digital map—it is established that the text object is of the type "street name", (i.e., identifies a street), is provided in the German language, and relates to a street in Germany. This information is significant for the following steps, in particular for selecting the linguistic, semantic and morphological background information to be used for the analysis.

Subsequently, it is ascertained on the basis of the auxiliary information stored for this text object that the text component "Beckmann" relates to the name of the street, while the text component "-strasse" relates to the street type and/or the characterization of the text object as a street. Furthermore, the attachment between the text components "Beckmann" and "strasse" is ascertained as a connected attachment, because none of the recognized separators (space, hyphen or apostrophe) was previously found between the two text components "Beckmann" and "strasse". In addition, it is established that the street type "strasse" is situated after the base name "Beckmann" in the sequence here.

On the basis of the characterization of the text component "strasse", it may now be established completely automatically that the text component "strasse" has a lesser semantic relevance than the text component "Beckmann". This corresponds to the experiential fact that for the user—for example upon the selection of a travel destination or when looking for a street name—the street identification plays a massively more important role than the street type.

A further analysis of the text component "Beckmann" is now performed, for which corresponding lists of German articles, prepositions and morphological meaning contents stored in the device are used in particular. In the present case, the analysis for suffixes and prefixes does not result in any hits, nor does the analysis for the presence of articles or prepositions result in any hits, because the text component "Beckmann" does not contain any such elements. A further morphological (meaning-related) analysis based on stored morphological rules and associated text elements results, however, in the fact that the ending "mann" of the text component "Beckmann" has a statistically lesser semantic and/or morphological relevance than the word component "Beck".

The result of the now complete relevance analysis of the text object "Beckmannstrasse" to be depicted may be buffered in a space-saving manner in the form "5__10#0" using runlength coding. This means that from the character position 5 (letter "m"), 10 following letters have the relevance "zero".

For the purpose of the depiction of the analyzed text object "Beckmannstrasse", the previously ascertained information that no separator exists between the text area "Beck" having semantically higher relevance and the text area "mannstrasse" having semantically lower relevance is now used. In order to thus not generate any visual breakpoint, which may disturb the reading flow, between the text area having semantically higher relevance and the text area having semantically lower relevance, a successive adaptation of the degree of compression in the area of the jump point between the text area having higher semantic relevance and the text area having lower semantic relevance is performed.

This has the result that the text area "Beck", which is particularly semantically important for recognizing the street name, is displayed for the user having the letter size configured as maximal, after which a successive shrinking is performed in the area of the transition to the semantically less important text area "mannstrasse".

The remainder of the text area having semantically lower relevance is displayed adjoining the transition area using a specific minimal letter size, which is either fixed or may be dynamically calculated as a function of the available space. Patent Application DE 10 2006 052 663.5, which is incorporated herein by reference as if set forth in its entirety, is referred to in regard to the details of a method for ascertaining the maximal or minimal letter sizes.

The predefinition of a minimal or maximal letter size may also be oriented to the stored auxiliary information associated with the text object. Thus, objects of greater significance (e.g., large cities) may have larger maximal and also minimal letter sizes. Furthermore, it is possible for the letter sizes not to be predefined in the form of absolute numbers, but rather to be interpreted in percentages. In this manner, for example, it may be established that letters of text areas having minimal relevance are depicted at 60% of the size of the letters of the text areas having maximal or normal relevance.

The analysis and partial compression of the two-part street name "Berliner Chaussee" shown in FIG. 4 may be performed in a similar manner.

Here as well, firstly it is established on the basis of auxiliary information stored for this text object that the text object "Berliner Chaussee" to be handled is of the type "street name", is provided in the German language, and relates to a street in the geographic area of Germany.

Furthermore, it is known on the basis of the auxiliary information stored for this text object that the text component "Berliner" relates to the name of the street, while the text component "Chaussee [avenue]" describes the street type. The attachment between the text components "Berliner" and "Chaussee" is ascertained as separated, because there is a space between the two text components "Berliner" and "Chaussee", and thus one of the established separators (hyphen, space, apostrophe) has been found. Furthermore, it is established that the street type "Chaussee" is situated after the base name "Berliner" in the sequence here.

On the basis of the ascertained characterization of the text component "Chaussee" as the street type, a semantic relevance reduced in relation to the text component "Berliner" may automatically again be assigned to the text component "Chaussee".

An analysis of the text component "Berliner" is now performed, for which corresponding lists of German articles, prepositions and morphological meaning contents stored in the device may be used in particular. The analysis for suffixes and prefixes again does not result in any hits, nor does the analysis for articles or prepositions result in any hits, because the base text component "Berliner" does not contain any such components. However, the further morphological analysis has the result that the terminal syllable "-er" of the text component "Berliner" statistically has a lesser semantic and/or morphological relevance than the preceding word component "Berlin".

The result of the now completed relevance analysis of the text object "Berliner Chaussee" to be depicted may again be buffered in a space-saving manner using runlength coding, which is performed here in the form "7__2#0|10__8#0". In other words, this means that from the character position 7 (letter "e"), two following letters have the relevance "zero", after which a space follows. Subsequently, eight further letters having the relevance "zero" follow from the character position 10 (letter "C").

For the depiction of the analyzed text object "Berliner Chaussee", it is also ascertained that no separator is provided between the first text area "Berlin" having higher semantic relevance and the following text area "er" having lower semantic relevance, because of which a successive size adaptation is again performed between these two text areas.

It is established in regard to the further text area "Chaussee", which also has a low semantic relevance, that a separator is provided by the space in front of this text area, while the text end is reached after this text area. For this reason, no successive size adaptation is required in regard to this text area.

As shown in the illustration in FIG. 4, this has the result that the text area "Berlin", which is especially semantically important to the user, is displayed using the maximal letter size, after which a successive shrinking occurs in the area of the transition to the semantically less important text area "er". The further text area "Chaussee" having comparatively low semantic relevance is depicted as a whole having the minimal configured or ascertained letter size on the basis of the preceding analysis.

The analysis and partial compression of the location and/or community name "Frankfurt an der Oder" shown in FIG. 5 is performed similarly.

According to the auxiliary information stored for this text object, the text object "Frankfurt an der Oder" to be processed is a community name in the German language, and it relates to a community in the geographic area of Germany.

It is established on the basis of this information that a German article, preposition and suffix/prefix list is required for the further analysis, which is provided in the scope of the background information on the German language stored in the device. This further analysis is executed independently in each case for the individual components of the text object. Both the text components to be analyzed and also the comparative terms may be previously converted into uppercase letters from the stored word lists, to achieve independence from uppercase and lowercase letters in the analysis.

Firstly, the analysis for suffixes and prefixes does not result in any hits. The analysis for articles results in the text component "DER" as a hit as an article from letter position 14 in the name to be analyzed, the text component "DER" being separated from the remainder of the name on each side by spaces as separators. The preposition analysis also results in a hit, specifically the text component "AN", also separated from the remainder of the name by spaces as the separators, at the letter position 11 in the name. The further morphological analysis also has the result that the final syllable "furt" of the text component "Frankfurt" has a lesser semantic and/or morphological significance than the first word component "Frank".

The result of the now completed relevance analysis of the text object "Frankfurt an der Oder" to be depicted is again buffered in a space-saving manner using the runlength coding, which is performed in this example in the form "6_4#0|11_2#0|14_3#0". In other words, this means that from the character position 6 (letter "f"), four following letters have the relevance "zero", after which a separator follows. Subsequently, two further letters having the relevance "zero" follow from the character position 11 (letter "a"), another separator, and three further letters having a relevance "zero" follow from the character position 14 (letter "d"). The higher or normally high relevance of the text components "Frank" and "Oder" is not coded and stored separately, because in this embodiment it is fixed by definition that word components without separately stored relevance notation receive high relevance. Storage space may be saved in this manner.

Finally, it is established for the depiction of the analyzed text object "Frankfurt an der Oder" that no separator is provided between the first text area "Frank" having semantically higher relevance and the following text area "furt" having semantically lower relevance, because of which a successive size adaptation is again performed between these two text areas. In contrast, a space is provided in each case as a separator before and after the second and third text area having lower relevance ("an" and "der"), because of which no size adaptation is required in regard to the transitions between these text areas. As a result, a size adaptation is thus performed at the transition between "Frank" and "furt".

As shown in the illustration in FIG. 5, this has the result that the text areas "Frank" and "Oder", which are semantically significant to the user, are output on the display screen using the maximal letter size, while a successive shrinking is performed in the area of the transition to the semantically less important text area "furt". The further two text areas "an" and "der" having lower semantic relevance are shown in their entirety using the letter size configured as minimal on the basis of the preceding analysis.

The analysis and partially compressed depiction of the identification of an example of a point of interest named "Autohaus Bergland GmbH", cf. FIG. 6, is performed as shown in the following.

According to the information stored in addition to the observed text object "Autohaus Bergland GmbH" in the embodiment considered, the text object is the identification of a point of interest in the German language; furthermore, the point of interest is in Germany considered geographically.

On the basis of this auxiliary information, it is automatically established that a German article, preposition and business form abbreviation list is required for the further analysis. This is provided in the scope of the background information on the German language stored in the device. The further analysis is now performed independently in each case for the individual components of the observed text object. Both the text components to be analyzed and also the comparative terms from the above-mentioned stored word lists may each previously be converted into uppercase letters. Independence from uppercase and lowercase letters may thus be achieved in the analysis.

In the present case, firstly the analysis for suffixes and prefixes and for articles does not result in any hits. The analysis for business forms results in the text component "GmbH" as a hit from letter position 19 in the text object to be analyzed, the text component "GmbH" being separated on each side from the remainder of the text object by spaces as separators. Finally, the subsequent morphological analysis has the result that the final syllable "land" of the text component "Bergland" has a lesser semantic and/or morphological relevance than the first word component "Berg".

The result of the thus completed relevance analysis of the text object "Autohaus Bergland GmbH" to be depicted is again buffered in a space-saving manner using runlength coding, which is performed in this example in the form "14_4#0|19_4#0". In other words, this means that from the character position 14 (letter "l"), four following letters have the relevance "zero", after which a separator follows. Subsequently, four further letters having the relevance "zero" follow from the character position 19 (letter "G"). The higher or normally high relevance of the text components "Autohaus" and "Berg" is again not separately coded and stored, to save storage space in this manner.

For the purpose of depicting the analyzed text object "Autohaus Bergland GmbH" on the display screen, it is also analyzed that no separator is provided before the first text area "land"—which was ascertained to be less relevant—and the preceding text area "Berg" having semantically higher relevance, because of which a successive size adaptation is again performed at the transition between these two text areas, so as not to generate a visually disturbing jump point. In contrast, a space is provided as a separator before the second text area having lower relevance ("GmbH"), and this second text area having lower relevance goes up to the text end. Therefore, no size adaptations are required in regard to the boundaries of this text area, and the text area "GmbH" is thus displayed completely in the letter size configured as minimal without successive size adaptation.

As shown in the illustration in FIG. 6, this has the result that the text areas "Autohaus" and "Berg", which are semantically significant for the user, are output on the display screen using the maximal letter size, while a successive shrinking occurs in the area of the transition to the semantically less important text area "-land". The further text area "GmbH" having semantically lower relevance is shown in its entirety using the letter size configured as minimal on the basis of the preceding analysis.

As a further example, the case may also occur in which a text object to be depicted has a continuously constant semantic relevance. An example of this is the Polish location name "Stubice".

On the basis of the auxiliary information stored for this text object, it is established that a Polish article, preposition and suffix/prefix list is required for the further analysis. This list is provided in the scope of the background information on the Polish language stored in the device.

In this example, the suffix/prefix analysis does not result in any hits, nor do the article analysis or the preposition analysis. The further morphological analysis also does not result in any indication of components of the location name "Stubice" having especially high or especially low semantic relevance.

The result of the thus completed relevance analysis of the text object "Stubice" to be depicted is stored as <empty> in this case, and/or there is no storage of a relevance value for this text object. In other words, this means that the entire text object is evaluated as relevant and the letter size configured as maximal is used for all letters in the display screen output.

As a result, it is thus clear that a device and a method for generating a textual depiction are provided by the invention, using which the drawbacks to be encountered in the prior art in text depiction may be decisively improved on display screens having small dimensions in particular. Particularly in the field of navigation devices, the present invention also allows larger text objects, such as long street identifications, to be displayed on small navigation display screens, without valuable space required for other purposes on the display screen being lost and/or without these text objects having to be depicted shortened or cut off, from which the readability and the rapid comprehension of the meaning could suffer.

Embodiments of the invention thus provide a decisive contribution to improving the ability to depict text objects in particular on small display screens in mobile devices. Precisely for navigation devices, the rapid and intuitive comprehension of the significance of the display screen content is decisively improved, which also favors the safety of the user and the better concentration of the user on the street traffic.

The invention claimed is:

1. A method for preparing a text object being a word consisting of multiple letters using a processor unit, for the purpose of depicting the text object using a graphic output device, the text object comprising a normal text area having word letters in the original size and a text area to be compressed having word letters shrunken and/or compressed in relation to the original size, the method comprising:
    a) analysis of the word text object to be depicted on the basis of stored semantic, morphological, and/or linguistic rules and/or stored auxiliary information;
    b) morphological division of the word text object to be depicted into text areas and/or morphemes;
    c) ascertainment of the semantic relevance of the text areas and/or morphemes;
    d) storage of the relevance analysis results for each text area having reduced semantic relevance;
    e) rendering of the word letters of text areas having normal semantic relevance in the original size and the word letters of text areas having reduced semantic relevance using shrunken size dimensions on the basis of the relevance analysis results, wherein only the letters associated with text areas having reduced semantic relevance are rendered using the shrunken size dimensions;
    f) output of the rendered word text object on the graphic output device.

2. The method claim of claim 1, wherein the auxiliary information in method step a) comprises current country, language, object type, location type and/or location size, street type and street significance and/or text position of the object type in the object name.

3. The method of claim 1, wherein the auxiliary information in method step a) comprises lists of text components having reduced semantic relevance, such as prefixes, infixes, suffixes, initial syllables and terminal syllables, language-specific articles and prepositions, abbreviations and business forms, lists of separators, and/or rules for composite formation and syllable separation.

4. The method of claim 1, wherein in method step e), letters within defined surroundings of a the jump point between normal and compressed text areas are rendered steadily and/or continuously between the size dimension of the letters of the normal text area and the size dimension of the letters of the compressed text area.

5. The method of claim 4, wherein if a separator is present at the jump point in method step e), a discontinuous, sudden change of the letter size occurs.

6. The method of claim 1, wherein ascertaining and storing the relevance analysis results in method steps c) and d) occurs in the form of the assignment of a more than two-stage relevance value to the particular text area.

7. The method of claim 1, wherein the storage of the relevance analysis results in method step d) is performed with data compression using runlength coding.

8. The method of claim 1, wherein method steps a) through d) are performed at the runtime directly preceding the letter rendering.

9. The method of claim 1, wherein method steps a) through d) are performed in the scope of preprocessing of a database comprising the text object.

10. The method of claim 1, wherein the original size is a variable, the original size being fixed as a function of the space available for depicting the text object and/or as a function of the object significance of the text object.

* * * * *